United States Patent
Kobayashi

(10) Patent No.: US 7,733,515 B2
(45) Date of Patent: Jun. 8, 2010

(54) TWO-BRANCH OUTPUTTING SOLID-STATE IMAGING DEVICE, DRIVING METHOD FOR THE SAME AND IMAGING APPARATUS

(75) Inventor: Makoto Kobayashi, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 618 days.

(21) Appl. No.: 11/709,765

(22) Filed: Feb. 23, 2007

(65) Prior Publication Data

US 2007/0212014 A1     Sep. 13, 2007

(30) Foreign Application Priority Data

Feb. 23, 2006  (JP) .................... P.2006-047083

(51) Int. Cl.
    *H04N 1/40*    (2006.01)
(52) U.S. Cl. ..................... 358/1.15; 358/483
(58) Field of Classification Search ............ 358/1.9, 358/1.15–1.18, 482–483
    See application file for complete search history.

(56) References Cited

U.S. PATENT DOCUMENTS 5,309,240 A * 5/1994 Miwada ................. 348/311
7,580,073 B2 * 8/2009 Ikeda et al. ............. 348/311

FOREIGN PATENT DOCUMENTS

| JP | 5-308575  | A  |   | 11/1993 |
|----|-----------|----|---|---------|
| JP | 2624138   | B2 |   | 4/1997  |
| JP | 2949861   | B2 |   | 7/1999  |
| JP | 11196334  | A  | * | 7/1999  |

* cited by examiner

*Primary Examiner*—Edward L Coles
*Assistant Examiner*—Stephen M Brinich
(74) *Attorney, Agent, or Firm*—Birch, Stewart, Kolasch & Birch, LLP

(57) ABSTRACT

A solid-state imaging device is provided and includes: a semiconductor substrate; a plurality of photoelectric conversion elements arranged in a two-dimensional array, each of the photoelectric conversion elements accumulating a signal charge in accordance with a received amount of light; a charge transfer path that transfers the signal charge read out from the photoelectric conversion elements; two branch transfer paths, each receiving the signal charge transferred through the charge transfer path and transferring the signal charge to an output end of the solid-state imaging device; a charge branching part in a connecting portion between the charge transfer path and the two branch transfer paths, the charge branching part distributing the signal charge toward one of the two branch transfer paths, and a unit that treats signals corresponding to branching residual charges in the charge branching part so that the signals are distributed in a checkerboard pattern on a reproduced image.

7 Claims, 8 Drawing Sheets

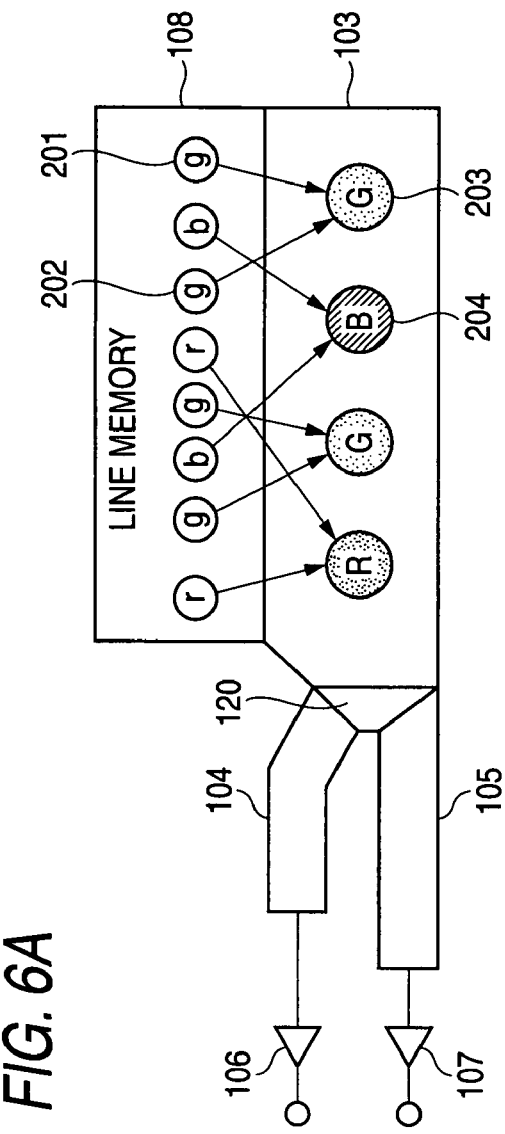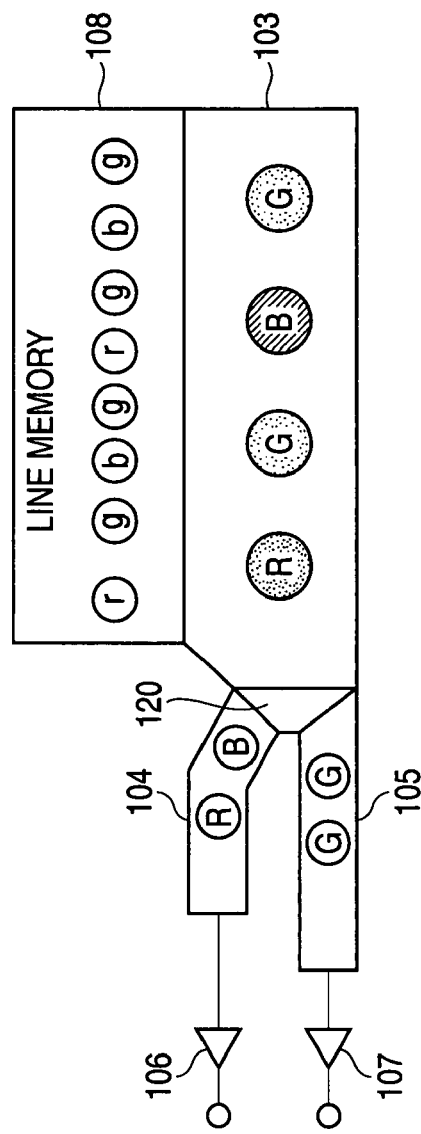

TWO-BRANCH OUTPUTTING SOLID-STATE IMAGING DEVICE, DRIVING METHOD FOR THE SAME AND IMAGING APPARATUS

BACKGROUND OF THE INVENTION

1. Field of the Invention

The present invention relates to a solid-state imaging device of CCD (charge coupled device) type in which a charge transfer path (transfer register) is branched into parallel two paths at an output end, a driving method therefor and an imaging apparatus, and more particularly to a two-branch output type solid-state imaging device suitable for improving the quality of a captured image, a driving method therefor and an imaging apparatus.

2. Description of Related Art

Recent solid-state imaging devices of CCD type have shown an increase in the number of pixels along with the progress in the semiconductor micro-fabrication technology, and have reached a level of containing several million pixels. It is therefore required to increase the transfer drive frequency for a horizontal transfer path for reading out signals, thus leading to a drawback that a voltage signal output from an output amplifier is distorted in waveform.

Therefore developed is a technology of branching an output end of the horizontal transfer path in parallel manner, performing the transfer in the horizontal transfer path with a high-frequency signal, and, in a distributing part (branching part), distributing signal charges, transferred in succession through the horizontal transfer path, to successively distribute to the branched transfer paths, thereby reducing a drive frequency of the branched transfer paths lower than the drive frequency of the horizontal transfer path (for example see JP-A-5-308575, Japanese Patent No. 2949861 and Japanese Patent No. 2624138).

A technology in JP-A-5-308575 describes a construction of branching the output end of the horizontal transfer path into three, and distributing and outputting an R (red-color) signal charge, a G (green-color) signal charge and a B (blue-color) signal charge respectively the branched transfer paths, whereby the drive frequency of the branched transfer paths is made ⅓ of the drive frequency of the horizontal transfer path.

However, in a solid-state imaging device containing several million pixels or higher and capable of capturing a high-definition image for example of high-vision quality, the horizontal transfer path has to be driven with a considerably high frequency, so that it is difficult, in the distributing part, to clearly distribute the signal charges into three ways while maintaining a high transfer efficiency (namely without a residual charge in charge transfer).

Technologies in Japanese Patent No. 2949861 and Japanese Patent No. 2624138 propose a solid-state imaging device of two-branch output type. Such two-branch output type has advantages, in comparison with the three-branched output type, of an easier distribution of the signal charges at the distributing part and a drive frequency for the horizontal transfer path only as high as twice of the drive frequency for the branched transfer paths.

However, Japanese Patent No. 2949861 and Japanese Patent No. 2624138 do not describe transfer of signal charges of a color image. In such two-branch output type solid-state imaging device, the branching part distributes signal charges for example of red and blue colors to a branched path and a signal charge of green color to the other branched path. Therefore, in the case that a residual charge is generated in the branching part, a branching residual charge, generated in a previous stage and corresponding for example to red color, is mixed in a signal charge, to be branched in a next stage and corresponding to green color, thereby deteriorating the quality of the captured image.

A two-branch output type solid-state imaging device has an advantage of elevating a data rate in a horizontal transfer path as a drive frequency after branching can be reduced to ½, but is associated with a drawback that the image quality of a captured image is deteriorated when a residual charge is generated in branching the signal charge.

SUMMARY OF THE INVENTION

An object of an illustrative, non-limiting embodiment of the invention is to provide a solid-state imaging device capable of capturing a color image with a satisfactory image quality, a driving method therefor and an imaging apparatus.

According to an aspect of the invention, there is provided a solid-state imaging device including:

a semiconductor substrate;

a plurality of photoelectric conversion elements arranged in a two-dimensional array, each of the photoelectric conversion elements accumulating a signal charge in accordance with a received amount of light;

a charge transfer path that transfers the signal charge read out from the photoelectric conversion elements;

two branch transfer paths, each receiving the signal charge transferred through the charge transfer path and transferring the signal charge to an output end of the solid-state imaging device;

a charge branching part in a connecting portion between the charge transfer path and the two branch transfer paths, the charge branching part distributing the signal charge toward one of the two branch transfer paths, and a unit that treats signals corresponding to branching residual charges in the charge branching part so that the signals are distributed in a checkerboard pattern on a reproduced image.

In the solid-state imaging device, the charge transfer path may include: a plurality of vertical transfer paths, each transferring the signal charge in a vertical direction along a surface of the semiconductor substrate; and a horizontal transfer path that receives the signal charge through the vertical transfer paths and transfers the signal charge to the charge branching part along a horizontal direction perpendicular to the vertical direction, and the solid-state imaging device may further include a line memory that receives the signal charge transferred through the vertical transfer paths and output the signal charges to the horizontal transfer path at a timing, and the line memory is the unit.

In the solid-state imaging device, the line memory may store: a red-color signal charge in accordance with a received amount of light having a red color; a green-color signal charge in accordance with a received amount of light having a green color; and a blue-color signal charge in accordance with a received amount of light having a blue color, in an orderly manner, and the line memory may output the red-color, green-color and blue color signal charges to the horizontal transfer path at timings to perform a pixel addition along the horizontal direction with respect to signal charges having the same color. The checkerboard pattern of the signals corresponding to the branching residual charges can be realized on a reproduced image by performing the pixel addition at different timings for odd and even lines of the reproducing image.

According to an aspect of the invention, there is provided a method for driving a solid-state imaging device, the solid-state imaging device including:

a semiconductor substrate;

a plurality of photoelectric conversion elements arranged in a two-dimensional array, each of the photoelectric conversion elements accumulating a signal charge in accordance with a received amount of light;

a charge transfer path that transfers the signal charge read out from the photoelectric conversion elements;

two branch transfer paths, each receiving the signal charge transferred through the charge transfer path and transferring the signal charge to an output end of the solid-state imaging device; and a charge branching part in a connecting portion between the charge transfer path and the two branch transfer paths, the charge branching part distributing the signal charge toward one of the two branch transfer paths, the method including reading out signals corresponding to branching residual charges in the charge branching part so that the signals are distributed in a checkerboard pattern on a reproduced image.

According to an aspect of the invention, there is provided an imaging apparatus including a solid-state imaging device as the above-described.

BRIEF DESCRIPTION OF THE DRAWINGS

The features of the invention will appear more fully upon consideration of the exemplary embodiments of the inventions, which are schematically set forth in the drawings, in which:

FIGS. 6A and 6B are views illustrating a pixel addition in horizontal direction, in an exemplary embodiment of the present invention;

DETAILED DESCRIPTION OF THE EXEMPLARY EMBODIMENTS

Although the invention will be described below with reference to the exemplary embodiment thereof, the following exemplary embodiment and its modification do not restrict the invention.

According to an exemplary embodiment of the invention, a solid-state imaging device distributes the signals corresponding to the branching residual charges in a checkerboard pattern on the reproduced image so as to be visually advantageous (so as to be less noticeable), thereby suppressing the deterioration in the image quality by the branching residual charges.

In the following, exemplary embodiments of the present invention will be explained with reference to the accompanying drawings.

Figure 1:
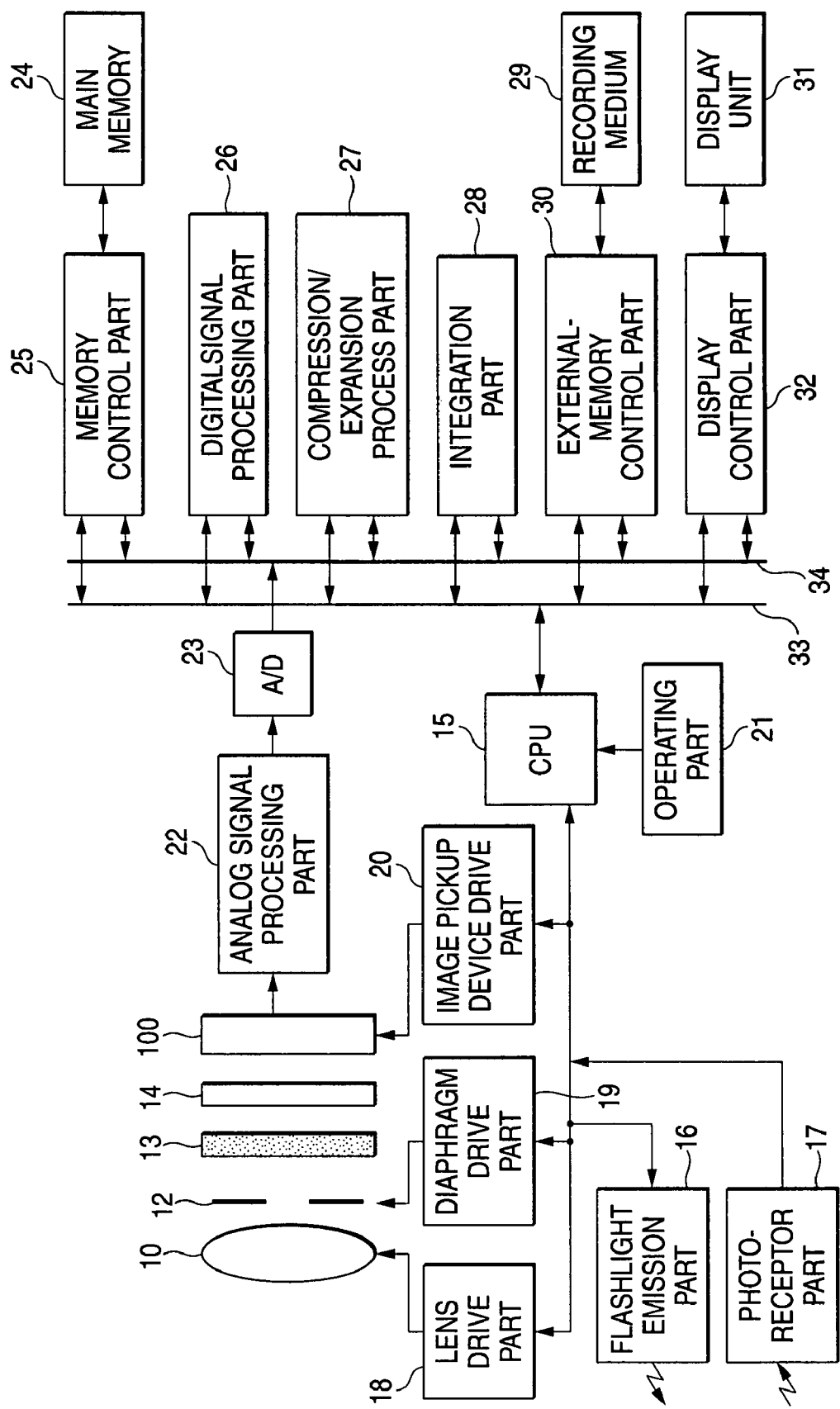
FIG. 1 is a functional block diagram of a digital camera in an exemplary embodiment of the present invention.

FIG. 1 is a view illustrating a construction of a digital camera, constituting an exemplary embodiment of the present invention. The illustrated digital camera is equipped with an image capturing lens 10, a CCD type solid-state imaging device 100 of which details will be described later, a diaphragm 12 provided therebetween, an infrared cut-off filter 13, and an optical low-pass filter 14. A CPU 15 controlling the entire digital camera controls a flashlight emission part 16 and a photoreceptor part 17, also controls a lens driving part 18 to regulate the image capturing lens 10 to an in-focus position and control an aperture amount of the diaphragm 12 through a diaphragm drive part 19 to regulate an exposure amount.

The CPU 15 also drives the solid-state imaging device 100 through an imaging device drive part 20, thereby causing an object image, captured through the image capturing lens 10, to be output as a color signal. The CPU 15 receives an instruction signal from the user through an operation part 21 and executes various controls according to such instruction.

An electrical control system of the digital camera is equipped with an analog signal processing circuit 22 connected to the output of the solid-state imaging device 100, and an A/D conversion circuit 23 for converting RGB color signals from the analog signal processing part 22, and these circuits are controlled by the CPU 15.

The electrical control system of the digital camera is further equipped with a memory control part 25 connected to a main memory (frame memory) 24, a digital signal processing part 26 for performing an interpolating operation, a gamma correcting operation, an RGB/YC converting operation and the like, a compression/expansion part 27 for compressing a captured image into a JPEG image or expanding a compressed image, an integrating part 28 for integrating a light-metering data and determining a gain of a white balance correction to be performed by the digital signal processing part 26, an external memory control part 30 to which a detachable memory medium 29 is connected, and a display control part 32 to which a liquid crystal display unit 31 mounted at the back of the digital camera is connected, and these parts are connected with one another by a control bus 33 and a data bus 34 and are controlled by instructions from the CPU 15.

Figure 2:
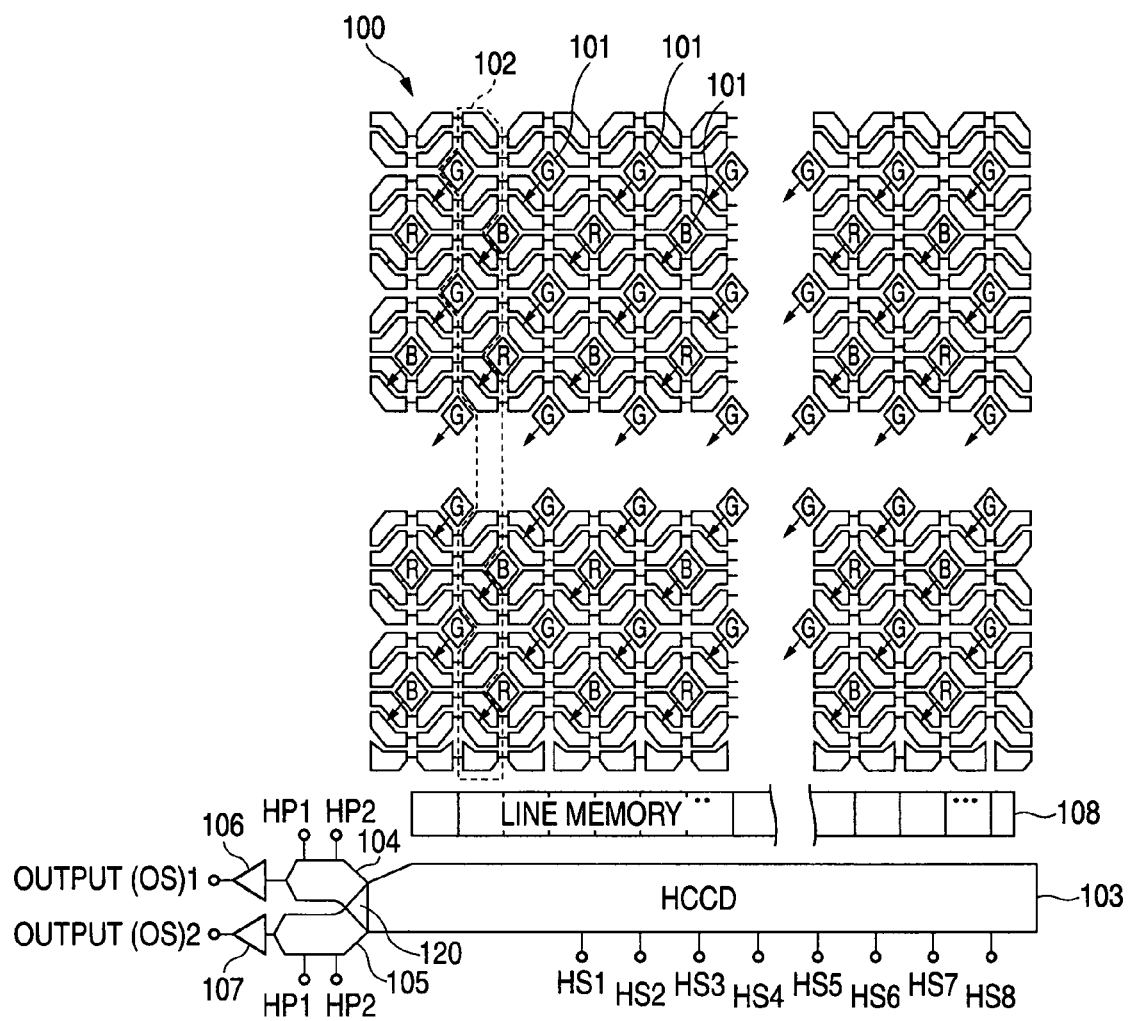
FIG. 2 is a schematic view of a surface of the two-branch output type solid-state imaging device shown in FIG. 1.

FIG. 2 is a schematic plan view of the solid-state imaging device 100 shown in FIG. 1. The illustrated solid-state imaging device 100 is constructed as a two-branch output type. This solid-state imaging device 100 includes a plurality of photodiodes (photoelectric conversion elements) 101 arranged in a two-dimensional array on a semiconductor substrate, in which the photodiodes 101 of even-numbered rows are displaced by a ½ pitch with respect to those of odd-numbered rows (so-called honeycomb pixel arrangement).

Characters "R", "G" and "B" marked on the respective photodiodes 101 indicate colors (R=red, G=green, B=blue) of color filters stacked on the respective photodiodes, and each photodiode 101 accumulates a signal charge corresponding to a received light amount of one of three primary colors. Here there will be explained an example utilizing color filters of a primary color system, but color filters of a complementary color system may also be utilized.

Horizontally along the surface of the semiconductor substrate, a vertical transfer electrode is provided so meandering as to circumvent the photodiodes 101. In the semiconductor substrate at a side of a column of photodiodes arrayed along the vertical direction, an unillustrated embedded channel is provided in the vertical direction so meandering as to circumvent the photodiodes 101. The embedded channel and the vertical transfer electrode provided thereon and meandering along the vertical direction constitute a vertical transfer path (VCCD) 102.

In a lower end part of the semiconductor substrate, a horizontal transfer path (HCCD) 103 is provided. The horizontal transfer path 103 is constituted of an embedded channel and a horizontal transfer electrode provided thereon, and is driven by transfer pulses HS1, HS2, HS3, HS4, HS5, HS6, HS7 and HS8 supplied from the imaging device drive portion 20.

An output terminal end of the horizontal transfer path 103 is branched, by a charge distributing part (charge branching part) 120, into a first branched transfer path 104 and a second branched transfer path 105. The first branched transfer path 104 and the second branched transfer path 105 have a structure similar to that of the horizontal transfer path 103 (embedded channel and transfer electrode), and a first output amplifier 106 is provided at the output end of the first branched transfer path 104, for outputting a voltage signal corresponding to the charge amount of the signal charge transferred to such output end, while a second output amplifier 107 is provided at the output end of the second branched transfer path 105, for outputting a voltage signal corresponding to the charge amount of the signal charge transferred to such output end.

The first branched transfer path 104 and the second branched transfer path 105 can be two-phase driven by transfer pulses HP1, HP2, which are generated by a ½ frequency division of the transfer pulses HS1 (=HS3=HS5=HS7), HS2 (=HS4=HS6=HS8) from the imaging device drive part 20 for driving the horizontal transfer path 103.

The two-branch output type solid-state imaging device 100 of the present embodiment is equipped, at a boundary portion between the end portions of the vertical transfer paths 102 and the horizontal transfer path 103, with a line memory 108 positioned along the horizontal transfer path 103.

The line memory 108 serves, as described in JP-A-2002-112, to temporarily store the signal charge received from each vertical transfer path 102 and to control an output timing to the horizontal transfer path 103 according to an instruction from the imaging device control part 20, and is used for example for performing a pixel addition of the signal charges in the horizontal direction. The pixel addition is performed in case of capturing a moving image with the digital camera, namely in case of outputting a reduced image, but is not performed in case of capturing a still image.

The description has been made with terms "vertical" and "horizontal", and these terms mean "one direction" and "a direction substantially perpendicular to the one direction" along the surface of the semiconductor substrate.

Figure 3:
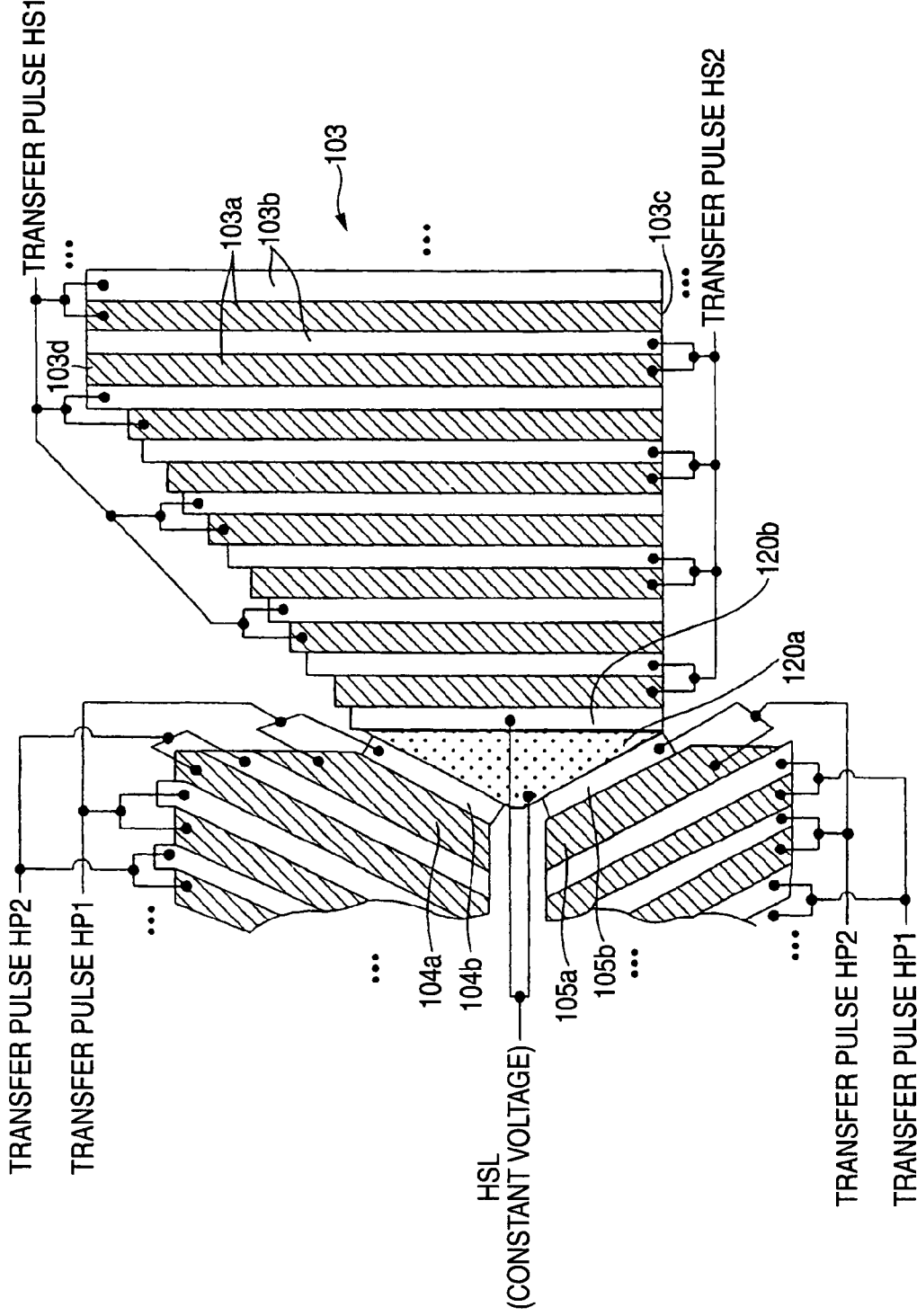
FIG. 3 is a schematic view of a surface, illustrating details of a charge distributing part (branching part) illustrated in FIG. 2.

FIG. 3 is a schematic view of the surface, illustrating details of the charge distributing part 120 in a connecting portion between the horizontal transfer path 103 and the branched transfer paths 104, 105 shown in FIG. 2. The horizontal transfer path 103 has a known structure which is constituted of an embedded channel and sets of a first layer electrode 103a and a second layer electrode 103b, the sets being stacked thereon in repetition and in which the transfer pulse HS1 is applied to every other ones of the sets of the first layer electrode 103a and the second layer electrode 103b and the transfer pulse HS2, opposite in phase to the transfer pulse HS1, is applied to the remaining every other ones of the sets.

The horizontal transfer path 103 of the present embodiment is so formed that the width of the embedded channel becomes narrower as it approaches to the charge distributing part 120, and the first layer electrodes 103a and the second layer electrodes 103b are formed gradually shorter so as to match the width. In the illustrated example, an upper side 103d of the horizontal transfer path 103 is made gradually closer to a base side 103c thereof, thereby reducing the width to about ½.

The charge distributing part 120 is provided between the horizontal transfer path 103 and the branched transfer paths 104, 105. The charge distributing part 120 is equipped with distributing electrodes (branching electrodes) constituted of a first layer electrode 120a and a second layer electrode 120b, stacked on the embedded channel formed with a narrowed width.

The first layer electrode 120a has a shape of a flat isosceles triangle, and, on a base part thereof, an edge part of an oblong rectangular second layer electrode 120b overlaps across an insulation layer. A fixed potential HSL, such as a ground potential, is applied to the first layer electrode 120a and the second layer electrode 120b from the imaging device drive part 20.

The first branched transfer path 104 is connected to one edge of the distributing electrode 120a, and the second branched transfer path 105 is connected to the other edge of the distributing electrode 120a. An end portion of the horizontal transfer path 103 of the present embodiment has such a structure that, in the vicinity of the charge distributing part 120, the channel width is gradually reduced at one side only, namely at the side of the edge mentioned above.

Each of the first branched transfer path 104 and the second branched transfer path 105 is formed by an embedded channel and sets of a first layer electrode (104a, 105a) and a second layer electrode (104b, 105b) stacked thereon in repetition, and the transfer pulse HP1 is applied to every other ones of the sets of the first layer electrodes and the second layer electrodes and the transfer pulse HP2, opposite in phase to the transfer pulse HP1, is applied to the remaining every other ones of the sets.

When the transfer pulse HP1 is applied to the first layer electrode 104a and the second layer electrode 104b which are closest to the distributing electrode 120a within the first branched transfer path 104, the transfer pulse HP2 is applied to the first layer electrode 105a and the second layer electrode 105b which are closest to the distributing electrode 120a within the second branched transfer path 105.

Figures 4A, 4B:
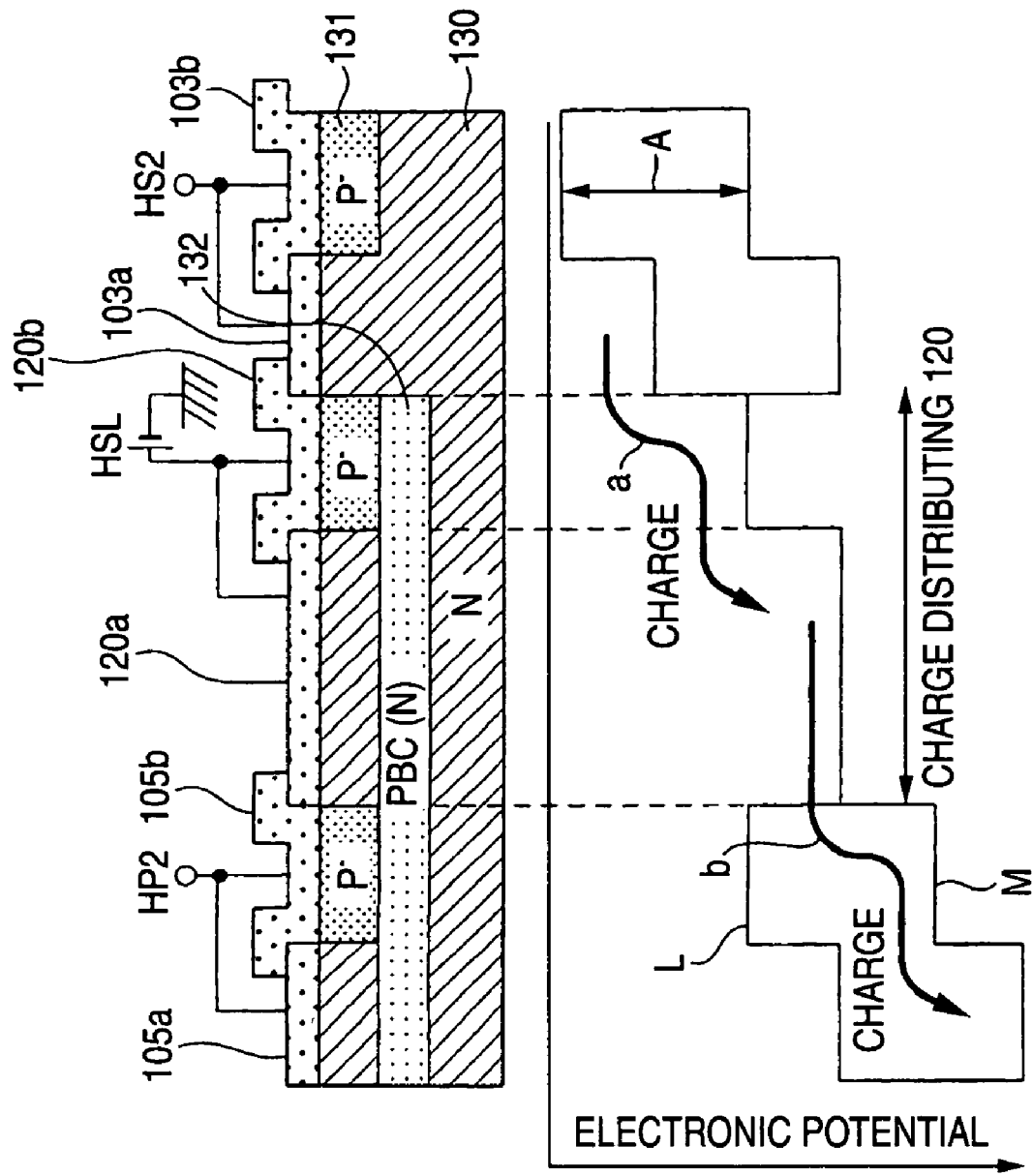
FIGS. 4A and 4B are respectively a schematic cross-sectional view and a potential chart of the charge distributing part illustrated in FIG. 2.

FIG. 4A illustrates a schematic cross-sectional view of the semiconductor substrate in the charge distributing part 120 and, FIG. 4B illustrates a potential chart.

In a p-well layer formed in a surficial part of an n-type semiconductor substrate, an n-type embedded channel 130 is formed. On the surface of the semiconductor substrate, first layer electrode films 103a, 120a and 105a (104a in case of first branched transfer path) are stacked across an unillustrated insulation layer, and, between such first layer electrode films, second layer electrode films 103b, 120b and 105b (or 104b) are stacked across an unillustrated insulation layer.

Immediately under the second layer electrode films 103b, 120b and 105b (or 104b) on the embedded channel 130, a p⁻ area 131 is formed. Also in the areas of the charge distributing part 120 and the first and second branched transfer paths 104, 105, embedded is an n-type layer 132 for controlling the potentials of the charge distributing part 120 and the first and second branched transfer paths 104, 105 at a necessary potential.

In the solid-state imaging device 100 of such construction, signal charges accumulated in the photodiodes 101 shown in FIG. 2 are read out to the vertical transfer path 102, and are transferred in the vertical direction. When the signal charges transferred in the vertical direction are transferred to the horizontal transfer path 103, the horizontal transfer pulses HS1, HS2 are applied thereto, whereby all the signal charges on the horizontal transfer path 103 are transferred in succession to the charge distributing part 120 along the horizontal transfer path 103.

Figure 5:
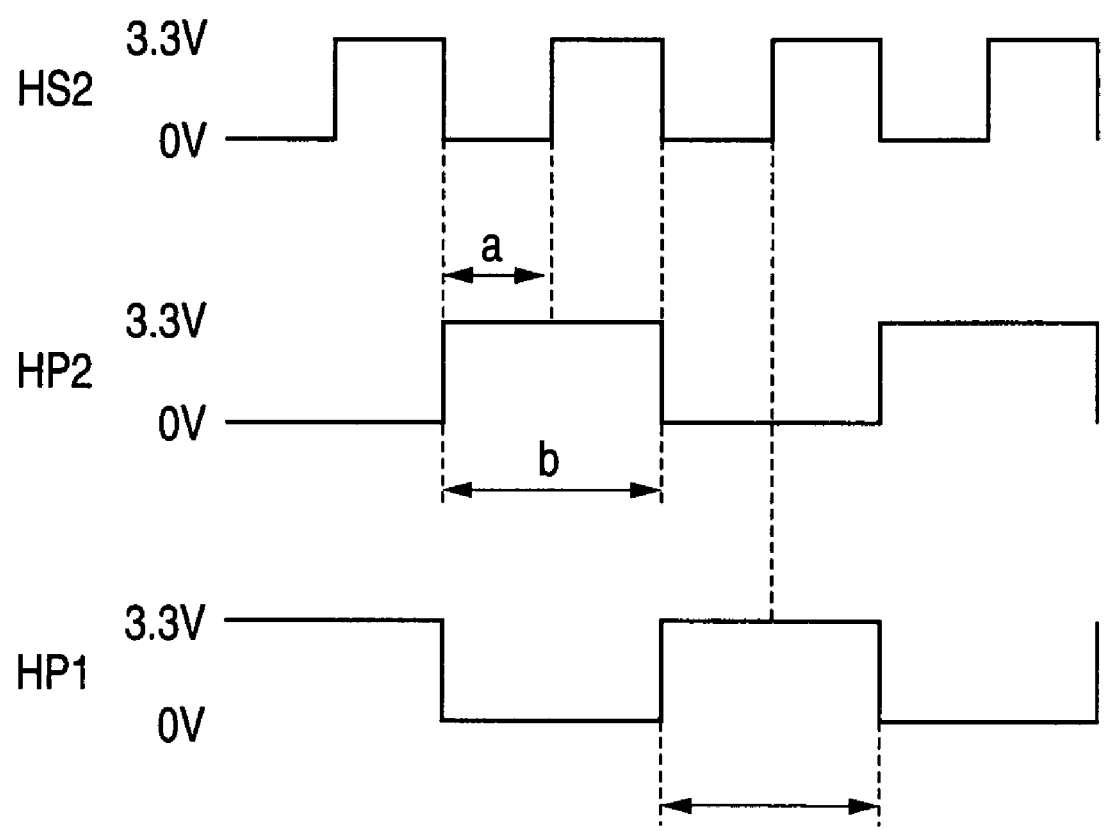
FIG. 5 is a timing chart illustrating drive pulses for the two-branch output type solid-state imaging device shown in FIG. 2.

FIG. 5 is a timing chart illustrating the horizontal transfer pulse HS2 and the transfer pulses HP1, HP2 applied to the branched transfer paths 104, 105. When the transfer pulse HS2 is applied to the first layer electrode 103a and the second layer electrode 103b, closest to the charge distributing part 120, potential thereof shifts up and down as indicated by arrows A in FIG. 4B.

The distributing electrodes 120a, 120b of the charge distributing part 120 are given a fixed voltage HSL, whereby the potential of the charge distributing part 120 is fixed. When the voltage, applied to the first layer electrode 103a and the second layer electrode 103b closest to the charge distributing part 120, becomes 0V in such state, the potential under the first layer electrode 103a becomes smaller (upward in FIG. 4B) than that of the charge distributing part 120b, and, when it becomes 3.3V, the potential under the first layer electrode 103a becomes larger (downward in FIG. 4B) than that of the charge distributing part 120b.

The signal charge transferred along the horizontal transfer path, as it comes closer to the charge distributing part 120, is enclosed in a narrower area because of the narrower channel width. Then, when the voltage, applied to the first layer electrode 103a and the second layer electrode 103b of the horizontal transfer path 103 closest to the charge distributing part 120, becomes 0V (when lifted to the upper side of an arrow A in FIG. 4B), the signal charge retained under the first layer electrode 103a flows into the charge distributing part 120 as indicated by (a) in FIG. 4B.

The first branched transfer path 104 and the second branched transfer path 105 are driven by the transfer pulses HP1, HP2 of a frequency that is ½ of that of the transfer pulses HS1, HS2. When the voltage, applied to the first layer electrode 103a of the horizontal transfer path 103 closest to the charge distributing part 120, becomes 0V, the first layer electrode 105a and the second layer electrode 105b of the second branched transfer path 105, closest to the charge distributing part 120, are given a voltage of 3.3V, while the first layer electrode 104a and the second layer electrode 104b of the first branched transfer path 104 are given a voltage of 0V.

Stated differently, the second branched transfer path 105 has a high potential (state M in FIG. 4B), while the first branched transfer path 104 has a low potential (state L in FIG. 4B). Consequently, the signal charge flowing into the signal distributing part 120 passes through the signal distributing part 120 and flows into the second branched transfer path 105 (as indicated by (b) in FIG. 4B).

A next signal charge flowing from the horizontal transfer path 103 into the signal distributing part 120 by a next transfer pulse HS2 flows into the first branched transfer path 104, since now the first branched transfer path 104 has a high potential (state M in FIG. 4B), and the second branched transfer path 105 has a low potential (state L in FIG. 4B).

FIG. 6A illustrates an addition of horizontal pixels to be performed when a moving image is read as a reduced image from the solid-state imaging device 100 shown in FIG. 2. Signal charges of two rows, constituted of an RB row and a G row shown in FIG. 2, are transferred by the vertical transfer path 102 and stored on the line memory 108 to constitute signal charges of one row. On the line memory 108, the signal charges are arranged in an order of r, g, b, g, r, g, b, g, . . . , in which "r", "g" and "b" indicate signal charges read out from photodiodes 101 respectively having red, green and blue color filters.

When a g-signal charge 201 shown in FIG. 6A is transferred to the horizontal transfer path 103, which is driven by the transfer pulses HS1, HS2, HS3, HS4, HS5, HS6, HS7 and HS8 to advance a packet on the horizontal transfer path containing the g-signal charge 201 to a position, on the line memory 108, corresponding to an adjacent g-signal charge 202, the g-signal charge 202 is moved from the line memory 108 into such packet. Through this operation, a G-signal charge 203 in the packet becomes a sum of the g-signal charge 201 and the g-signal charge 202, thereby achieving an addition of two pixels in the horizontal direction.

The r-signal charges and b-signal charges are also processed in a similar manner to execute an addition of nearest signal charges of a same color in the horizontal direction, and, as a result, the signal charges are arranged in an order of R, G, B, G, R, G, . . . on the horizontal transfer path. In the pixel addition illustrated in FIG. 6A, a B-signal charge 204 is formed by the pixel addition immediately before the G-signal charge 203.

Then, as illustrated in FIG. 6B, the R-signal charge and the B-signal charge are distributed in the branching part 120 to the first branched transfer path 104, while the G-signal charge is distributed in the branching part 120 to the second branched transfer path 105. Then voltage signals corresponding to the charge quantities of the R- and B-signal charges are read by the output amplifier 106, and a voltage signal corresponding to the charge quantity of the G-signal charge is read by the output amplifier 107.

In the case of a moving image, a pixel skipping is performed for the pixels in the vertical direction. More specifically, next to the RB row and G row shown in FIG. 2, signal charges are discarded in two rows which are a BR row and a G row, and then signal charges of further next two rows, which are an RB row and a G row, are stored in the line memory 108 and subjected to a pixel addition as shown in FIG. 6B.

Also in this case, an addition of two pixels in the horizontal direction is performed in the horizontal transfer path, but is performed at a timing different from that described in FIG. 6A. This operation will be described with reference to FIG. 7. In the present embodiment, the pixel addition shown in FIGS. 6A and 6B and the pixel addition shown in FIG. 7 are performed alternately to output image data from the solid-state imaging device 100.

The pixel addition illustrated in FIG. 6A is performed in such a manner that the B-signal charge 204 formed by addition precedes the added signal charge 203 formed from a 6th g-signal charge 201 and an 8th g-signal charge 202 aligned on the line memory 108. On the other hand, the pixel addition illustrated in FIG. 7 is performed in such a timing that the G-signal charge 203 of the sequential order is preceded by an R-signal charge 205. Stated differently, the pixel addition illustrated in FIG. 7 is performed earlier by two positions in such a manner that the R-signal charge and the B-signal charge are inverted in positions in comparison with those in FIG. 6A.

Figure 7:
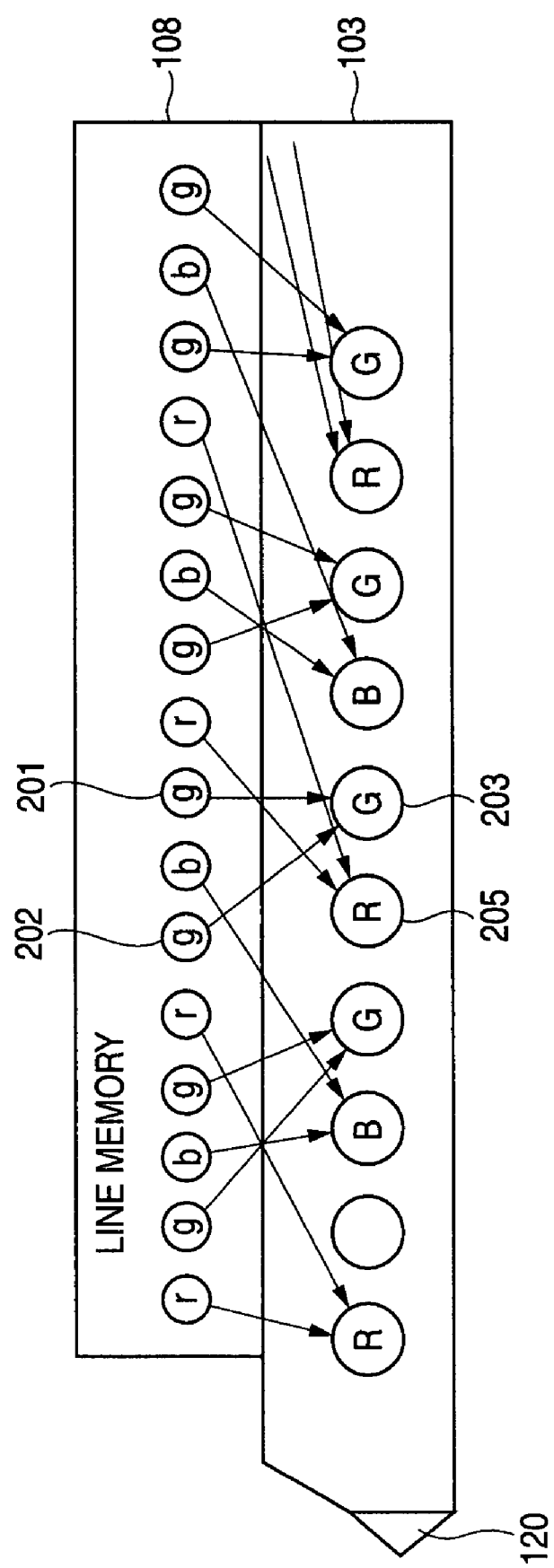
FIG. 7 is a view illustrating a pixel addition in horizontal direction, in an exemplary embodiment of the present invention.

After the pixel addition illustrated in FIG. 7, the R-signal charge and the B-signal charge are distributed in the branching part 120 to the first branched transfer path 104, while the G-signal charge is distributed in the branching part 120 to the second branched transfer path 105. Then voltage signals corresponding to the charge quantities of the R- and B-signal charges are read by the output amplifier 106, and a voltage signal corresponding to the charge quantity of the G-signal charge is read by the output amplifier 107.

Now explained is a reason for performing the pixel addition according to FIG. 6A and the pixel addition according to FIG. 7 alternately. In the case of capturing a color moving image and distributing the signal charges thereof in the charge branching part 120, a residual charge eventually generated in the charge distribution in the branching part 120 affects the image quality.

Let us consider a case of capturing an image of a red-colored object. In transferring and branching a G-signal charge of the captured color moving image, it may be preceded by an R-signal charge or a B-signal charge.

Since the object is red-colored, the R-signal charge has a high charge quantity and therefore causes a larger residual charge. The B-signal charge has a low charge quantity and therefore causes a smaller residual charge. Therefore, a G-signal charge, succeeding to an R-signal charge, will have a larger charge quantity, because of a mixing of the residual charge in branching the R-signal charge, in comparison with the G-signal charge succeeding to a B-signal charge.

Figure 8A:
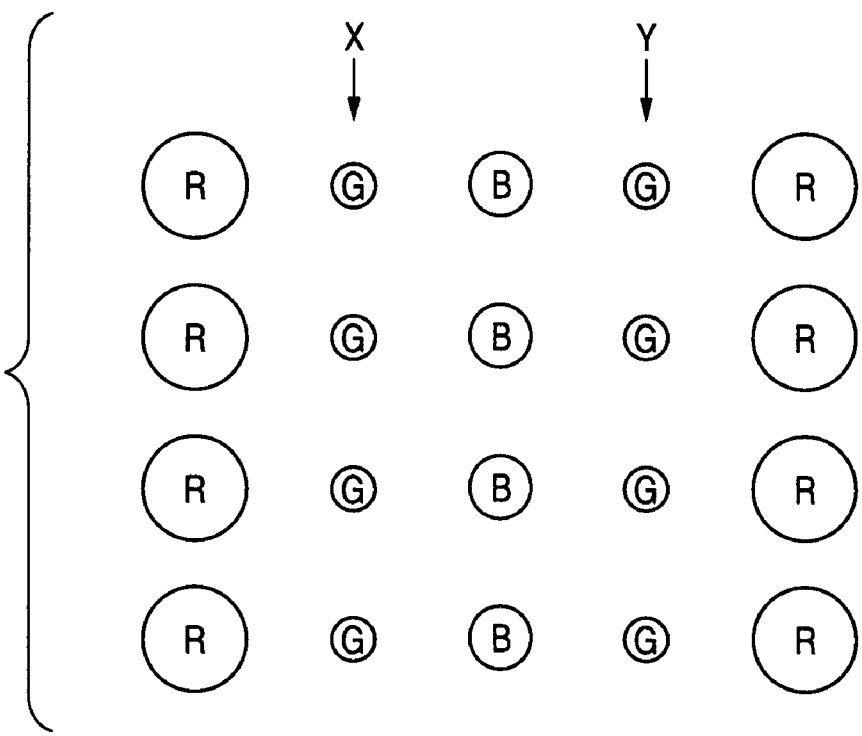
FIGS. 8A and 8B are views illustrating an effect of the pixel addition in a moving image output, in an exemplary embodiment of the present invention.

As a red-colored object image is captured, the G-signal charge should basically be of a contact charge quantity, regardless of the location. However, because of the presence of a residual charge in branching, the G-signal charge has a larger charge quantity when it succeeds to an R-signal charge. This situation is illustrated in FIG. 8A. A G-signal column X adjacent at the right-hand side to R-signals and a G-signal column Y adjacent at the right-hand side to B-signals should basically have a same signal quantity, but generate a difference because of the residual charge at branching, and such difference appears as a vertical line which deteriorates the image quality.

In the present embodiment, therefore, the pixel addition illustrated in FIG. 6A and the pixel addition illustrated in FIG. 7 are performed alternately to avoid generation of such vertical line. In the pixel addition in FIG. 6A and the pixel addition in FIG. 7, the pixel addition of g-signal charges is performed in the same manner, and, in forming a reproduced image based on thus added G-signal, the green (G) pixel remains in the same position.

Figure 8B:
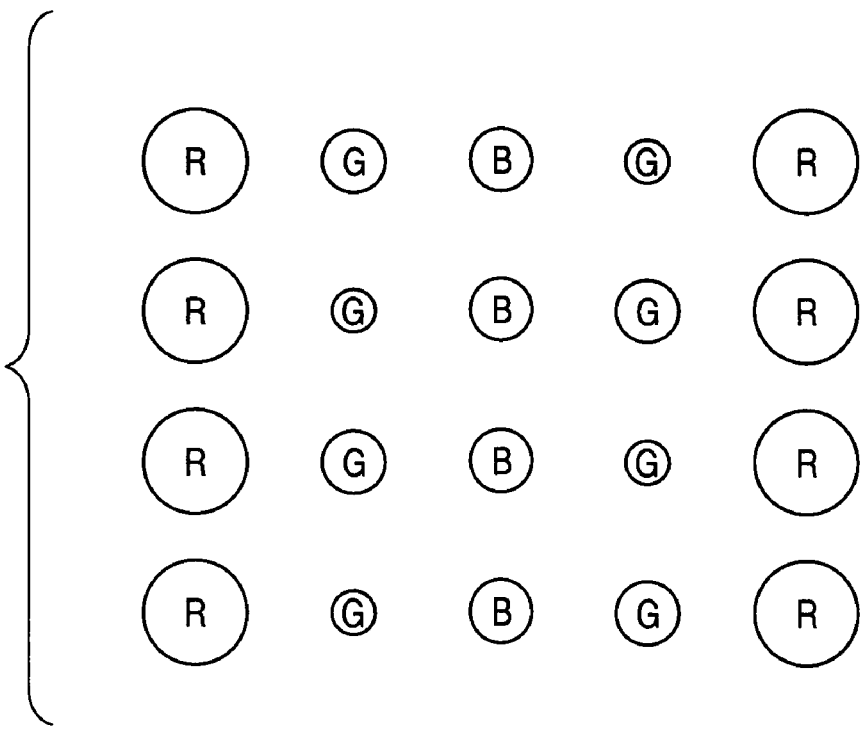

In FIGS. 6A and 7, R- and B-signals preceding G-signals are interchanged alternately. As it is easy to interchange B-signal and R-signal, output from the solid-state imaging device 100, in forming a reproduced image, the pixel addition in FIG. 6A is performed in odd-numbered rows and the pixel addition in FIG. 7 is performed in even-numbered rows, whereby the G-signals, based on G-signal charges containing the residual charges in branching the R-signal charges, can be arranged in a checkerboard pattern as shown in FIG. 8B. It is thus possible to prevent generation of the vertical line in G-signal, thereby avoiding the image quality deterioration.

The two-branch output type solid-state imaging device 100 of the present embodiment is capable, as described above, of preventing a deterioration in image quality in capturing a moving image. Also the voltage signals output from the output amplifiers 106 and 107 are released as signals corresponding to the signal charge quantities transferred with a drive frequency equal to ½ of that in the horizontal transfer path 103, so that the output data is not distorted in waveform even when the horizontal transfer path 103 is driven at a high speed.

Even in case of preparing output amplifiers 106 and 107 of a same structure on a same semiconductor substrate by a same manufacturing process, same characteristics are difficult to obtain. However it is made possible to absorb the difference in the gains of the output amplifiers by a construction of the present embodiment, in which the voltage signals for the signal charges of a same color is always obtained from a same output amplifier.

In case of reproducing a captured image from R, G and B image data output from the solid-state imaging device, the digital signal processing part 26 shown in FIG. 1 executes a white balance correction. The white balance correction unit such a correction that an originally "white" image, even when captured under light sources of various colors, can be represented as a "white" captured image, and is to regulate the gains for R, G and B colors in such a manner that mixing of all the R, G and B image data constituting a captured image becomes "colorless".

Even when the two output amplifiers 106 and 107 have a difference in the gains, such gain difference between the amplifiers can be absorbed by the white balance correction when the color data of a same color are always output from a same amplifier. It is thus possible to reproduce color image data of a satisfactory image quality, in which the gain difference does not appear on the image data.

Also the present embodiment has such a construction that the signal charge, transferred along the horizontal transfer path 103, is made to flow into the charge distributing part 120, after being constricted in the existing area, and that the charge distributing part 120 is given a fixed potential and is shaped as a flat isosceles triangle having a narrow width (length in the flowing direction of signal charge) of the potential well, so that the signal charge can be distributed to the first branched transfer path 104 or to the second branched transfer path 105 with little residual charge.

The solid-state imaging device of the present invention is adapted for use in a digital camera capable of capturing a high-definition moving image.

While the invention has been described with reference to the exemplary embodiments, the technical scope of the invention is not restricted to the description of the exemplary embodiments. It is apparent to the skilled in the art that various changes or improvements can be made. It is apparent from the description of claims that the changed or improved configurations can also be included in the technical scope of the invention.

This application claims foreign priority from Japanese Patent Application No. 2006-47083, filed Feb. 23, 2006, the entire disclosure of which is herein incorporated by reference.

What is claimed is:

1. A solid-state imaging device, comprising:
   a semiconductor substrate;
   a plurality of photoelectric conversion elements arranged in a two-dimensional array, each of the photoelectric conversion elements accumulating a signal charge in accordance with a received amount of light;
   a charge transfer path that transfers the signal charge read out from the photoelectric conversion elements, the charge transfer path including
      a plurality of vertical transfer paths transferring the signal charge in a vertical direction along a surface of the semiconductor substrate, and
      a horizontal transfer path that receives the signal charge through the vertical transfer paths and transfers the signal charge to a charge branching part along a horizontal direction perpendicular to the vertical direction;
   two branch transfer paths, each receiving the signal charge transferred through the charge transfer path and transferring the signal charge to an output end of the solid-state imaging device;
   the charge branching part in a connecting portion between the charge transfer path and the two branch transfer paths, the charge branching part distributing the signal charge toward one of the two branch transfer paths; and a line memory that receives the signal charges transferred through the vertical transfer paths and outputs the signal charges to the horizontal transfer path at a timing that distributes signal charges corresponding to branching residual charges in a checkerboard pattern on a reproduced image, the line memory storing a red-color signal charge in accordance with a received amount of light having a red color, a green-color signal charge in accordance with a received amount of light having a green color, and a blue-color signal charge in accordance with a received amount of light having a blue color, in an orderly manner, and the line memory outputting the red-color, green-color and blue-color signal charges to the horizontal transfer path at timings to perform a pixel addition along the horizontal direction with respect to signal charges having the same color, wherein the checkerboard pattern of the signal charges corresponds to the branching residual charges and is realized on the reproduced image by performing the pixel addition at different timings for odd and even lines of the reproduced image.

2. A method for driving a solid-state imaging device, comprising:

reading out signal charges accumulated on a plurality of photoelectric conversion elements arranged in a two-dimensional array;

transferring the signal charges read out from the photoelectric conversion elements through a plurality of vertical charge transfer paths;

receiving the signal charges transferred through the vertical charge transfer paths in a line memory;

performing pixel addition at different timings for odd and even rows of a reproduced image to generate a checkerboard pattern of signal charges corresponding to branching residual charges on the reproduced image;

transferring the signal charges to a horizontal charge transfer path;

distributing the signal charges on the horizontal charge transfer path to one of two branch transfer paths; and transferring the signal charges from the branch transfer paths to an output end of the solid-state imaging device.

3. An imaging apparatus comprising a solid-state imaging device according to claim 1.

4. The imaging apparatus according to claim 3, further comprising:

an imaging capturing lens;

a signal processing unit that processes a signal of an object image captured the solid-state imaging device;

a display unit that display the object image through the signal processing unit; and a control unit that controls the imaging apparatus.

5. The method for driving a solid-state imaging device according to claim 2, wherein the performing pixel addition at different timings includes:

adding signal charges corresponding to a first color in a first order for even rows; and adding signal charges corresponding to the first color in a second order different than the first order for odd rows.

6. The method for driving a solid-state imaging device according to claim 5, wherein the checkerboard pattern corresponds to pixels of the first color distributed across a plurality of columns of the reproduced image.

7. A solid-state imaging device, comprising:

a semiconductor substrate;

a plurality of photoelectric conversion elements arranged in a two-dimensional array, the photoelectric conversion elements accumulating signal charges in accordance with a received amount of light;

a plurality of vertical transfer paths transferring the signal charges in a vertical direction along a surface of the semiconductor substrate;

a line memory that receives the signal charges transferred through the vertical transfer paths, performs pixel addition at different timings for odd and even rows of a reproduced image to generate a checkerboard pattern of signal charges corresponding to branching residual charges on the reproduced image, and outputs the added signal charges to a horizontal transfer path;

the horizontal transfer path that receives the signal charges from the line memory and transfers the signal charge to a charge branching part along a horizontal direction perpendicular to the vertical direction;

two branch transfer paths, each receiving the signal charge transferred through the horizontal charge transfer path and transferring the signal charge to an output end of the solid-state imaging device; and the charge branching part in a connecting portion between the horizontal transfer path and the two branch transfer paths, the charge branching part distributing the signal charge toward one of the two branch transfer paths.

* * * * *